(12) United States Patent
Eagle

(10) Patent No.: US 6,226,739 B1
(45) Date of Patent: May 1, 2001

(54) METHOD AND COMPUTER PROGRAM FOR DISTRIBUTING SOFTWARE TO A PERSONAL PALM-TYPE DEVICE THROUGH A GLOBAL SOFTWARE DISTRIBUTION PACKAGE TRANSMITTABLE OVER THE WORLD WIDE WEB

(75) Inventor: Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/461,073

(22) Filed: Dec. 14, 1999

(51) Int. Cl.$^7$ .................................................. G06F 9/00
(52) U.S. Cl. ................................ 713/1; 713/100; 707/200
(58) Field of Search .................................... 713/1, 2, 100; 707/200, 203, 204, 205

(56) References Cited

U.S. PATENT DOCUMENTS

| | | | |
|---|---|---|---|
| 5,437,018 | * 7/1995 | Kobayashi et al. | 713/2 |
| 5,684,990 | 11/1997 | Boothby | 395/619 |
| 5,701,423 | 12/1997 | Crozier | 395/335 |
| 5,781,723 | 7/1998 | Yee et al. | 395/186 |
| 5,915,090 | * 6/1999 | Joseph et al. | 348/11 |
| 5,978,855 | * 11/1999 | Metz et al. | 709/249 |
| 6,084,584 | * 7/2000 | Nahi et al. | 345/329 |

* cited by examiner

Primary Examiner—Dennis M. Butler
(74) Attorney, Agent, or Firm—J. B. Kraft; Leslie A. VanLeeuwen

(57) ABSTRACT

A method and computer program is provided whereby a personal digital assistant or personal palm-type device of very limited RAM capacity can make available sufficient RAM capacity to store a complete global software distribution package so that the appropriate software or software upgrade may be installed into the device from the global package. The method includes the steps of: first deleting from the personal palm-type device RAM all application programs other than application programs required to support the device operating system to receive the global software distribution package and loading the received global software distribution package into the now available device RAM. Then, the software from the global package needed to make the distribution or upgrade of the device is loaded from the global distribution package into the device programmable ROM where all of the device software is permanently stored. Upon the completion of this distribution, the global software distribution package is deleted from said RAM, and all previously deleted application programs are then downloaded from the programmable ROM back into said device RAM. In most operations, the global software distribution package is transmitted to the personal palm-type device over a communication network, particularly the World Wide Web or Internet, either through linked modems or through wireless mobile communications.

10 Claims, 3 Drawing Sheets

METHOD AND COMPUTER PROGRAM FOR DISTRIBUTING SOFTWARE TO A PERSONAL PALM-TYPE DEVICE THROUGH A GLOBAL SOFTWARE DISTRIBUTION PACKAGE TRANSMITTABLE OVER THE WORLD WIDE WEB

TECHNICAL FIELD

The present invention relates to personal display terminals, generally referred to as personal palm-type devices, and more particularly, to the distribution of software to such palm devices.

BACKGROUND OF RELATED ART

Personal Digital Assistant (PDA) display terminals, such as the 3Com PalmPilot(™) and the International Business Machines Corporation (IBM) WorkPad(™) have been building a user base over the past few years. Current estimates are that there are a few million of these devices in present usage. While these personal devices have found limited selective markets among users with specific needs and habits, they have not, as yet, found the widespread appeal which was expected when they first began to appear almost a decade ago. Consequently, the technology is seeking applications of greater mass appeal. One area of great potential is in the area communication through the World Wide Web (Web) or Internet (used synonymously). In this connection, uses involving communication within the Web still require a fair degree of computer sophistication on the part of the user in receiving software via the Web, and in installing the software for basic program loading or in loading program upgrades. The user has to try to manipulate the very limited memory or storage resources available on the personal palm-type device in the installation of software and software upgrades.

With the globalization of computer system platforms involved in and linked through the Web, it has become increasingly common to distribute software and software upgrades which affect a wide variety of different Web computer system platforms through global software distribution packages such as Tivoli Corporation's software distribution package, the Tivoli Management Agent which will install and/or upgrade software across a wide variety of computer system platforms from the PC to enterprise system levels. Because such global software distribution packages must function to distribute software upgrades including enterprise level, the distribution package is relatively large and requires a considerable amount of Random Access Memory (RAM) capacity in each device which it services. This does not present any problems to most of the computers which are being upgraded by the package; even PCs can provide sufficient RAM capacity. However, personal digital assistants, i.e. personal palm-type devices, have very limited RAM, and thus lack the capacity to load such global software distribution packages. On the other hand, the global distribution packages are not dividable. Even though a great amount of the data in the package is intended for higher order systems and not required to upgrade the personal palm-type devices, the global software distribution package is not dividable into just the components needed to handle the distribution to just the personal device. Each computer or system being distributed to or upgraded must store the entire global software distribution package in its RAM.

SUMMARY OF THE PRESENT INVENTION

The present invention provides a solution to the problem of how a personal digital assistant or personal palm-type device can provide sufficient RAM capacity to store the complete global software distribution package so that the appropriate software or software upgrade may be installed into the device.

The method of the present invention comprises the steps of: first deleting from the personal palm-type device RAM all application programs other than application programs required to support the device operating system to receive the global software distribution package and loading the received global software distribution package into the now available device RAM. Then the software from the global package needed to make the distribution or upgrade of the device is loaded from the global distribution package into the device programmable Read Only Memory (ROM) where all of the device software is permanently stored. Upon the completion of this distribution, the global software distribution package is deleted from said RAM, and all previously deleted application programs are then downloaded from the programmable ROM back into said device RAM.

In most operations, the global software distribution package is transmitted to the personal palm-type device over a communication network, particularly the Web or Internet, either through linked modems or through wireless mobile communications. Communication between the personal palm-type device for receiving such global software distribution may be directly to the device from the Web or where the device is synchronized with a personal computer which functions as a receiving station on the network or Web, then the communication may be through the synchronized personal computer.

The present invention also provides a program operable on the personal palm-type device to carry out the above described method steps.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
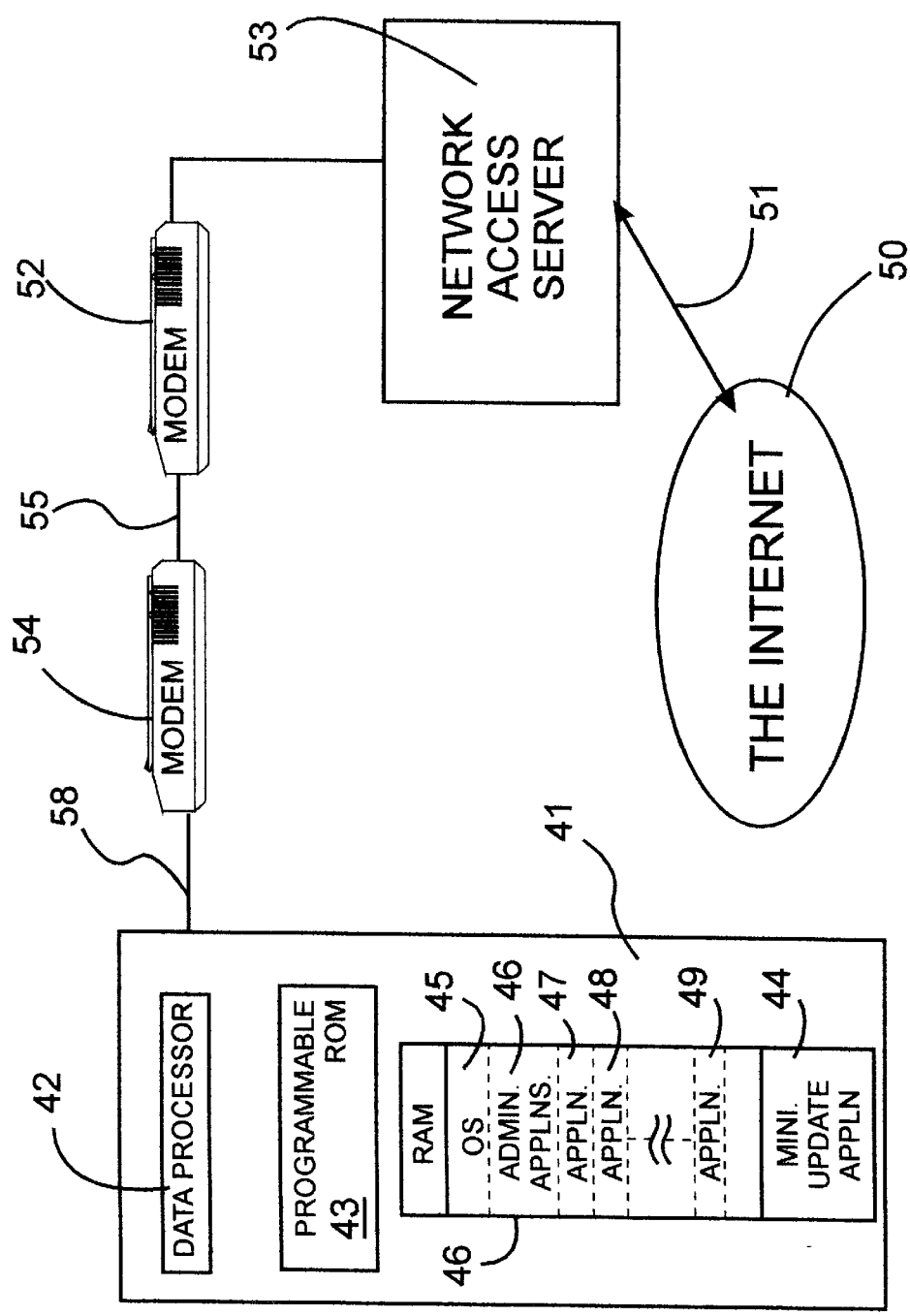
FIG. 1 is a generalized diagrammatic view of a Web portion showing the elements of the personal palm-type device, and how the global software distribution package may be transmitted from a source on the Web to the device.

Referring to FIG. 1, there is shown a very generalized diagram of how the personal palm-type device 41 may be connected into the Web 50 for the purposes of this invention. However, before proceeding further with this description, we will, at this point, provide some background with respect to the PDAs or personal palm-type devices being subjected to the software upgrades and to the global software distribution packages being transmitted and installed. The most common PDAs included in the present generic definition: personal palm-type devices include Microsoft's WinCE line; the PalmPilot line produced by 3Com Corp.; and IBM's WorkPad. These devices are comprehensively described in the text, *Palm III & PalmPilot,* Jeff Carlson, Peachpit Press, 1998. They contain data processors, operating systems, about 2 to 4 MB of RAM and a permanent programmable memory, a programmable ROM which may be an EPROM or flash ROM which are described in the text at page 38. Because these flash ROMs can now provide 4 MB of capacity, all of the application programs conventionally stored on the personal palm device's RAM may now also be stored in this ROM, in addition to the device operating system and built-in applications which are, conventionally, also stored in the ROM. Flash ROMs may be written into by a technique known as flashing so that future updates can be distributed as software and flashed into the ROM hardware.

Personal palm devices also have a networking protocol: TCP/IP, which permits connection to the Web through PDA modems, which are described in greater detail at pp. 148–149 of the above-described text.

As set forth hereinabove, it has now become conventional to simultaneously distribute or deploy software applications with interdependent components as a single unit, i.e. global software distribution package to networks of a wide variety of servers and clients on an enterprise level scale. For example, the global Tivoli Software Distribution package developed by Tivoli Corporation and described on the Web at: http://www.tivoli.com/prod . . . ocuments/datasheets/ software _dist.html will distribute software components across a network, the Web or portions of the Web.

A generalized diagram of a portion of the Web to which a personal palm-type device 41 is connected as shown in FIG. 1 to illustrate the global software distribution package transmission over the Web, and to show how the appropriate portions of the distribution package may be installed in the personal palm-type device 41 in accordance with the present invention. The personal palm-type device 41 includes a data processor 42, a programmable ROM 43, which is preferably the previously described Flash ROM, a RAM 40, which is shown in an operational state, loaded with the device's operating system 45, its administrative applications 46, including necessary utility applications, application programs 47 through 49, and the program of the present invention referred to as the Miniupdate Application 44. The device 41 may connected into the Web 50 through standard Web wired modem connections. Reference may be made to the text, *Mastering the Internet,* G. H. Cady et al., published by Sybex Inc., Alameda, Calif., 1996, particularly pp. 136–147, for typical connections between local display stations to the Web via access servers. The embodiment of FIG. 1 has a host-dial connection. Such host-dial connections have been in use for over 30 years through network access servers 53 which are linked 61 to the Web 50. The servers 53 may be maintained by a service provider to the personal palm-type device 41. The host's server 53 is accessed by the client device 41 through a normal dial-up telephone linkage 58 via modem 54, telephone line 55 and modem 52. The connection to access server 53 may also be made through wireless modems, described, for example, at pages 148 and 149 of the above-mentioned *Palm III & Palm Pilot* text. The global software distribution package is provided from a source 60, e.g. a Tivoli Software Distribution Package from a software distribution server, running on Unix OS, IBM OS/390 or Microsoft WindowsNT™ using IP or IPX protocols. The package is distributed via Web access server 51 onto the Web 50 from which the package is accessed by personal palm device 41 through linkage 61 and Web access server 53.

Before proceeding with the description of the method and program of this invention, conventional operation of the illustrative personal palm-type device should be considered. We are using the term personal palm-type device to generally cover all varieties of palm-type devices, which have, at times, been referred to as palm top devices. These include cellular phones and related wireless devices, smartphones, Internet screen phones, as well as video set top boxes. While all of these do not necessarily fit the criterion of being held in the operator's palm during use, they share the following characteristics. In addition, some sort of rudimentary display, the devices 41 are characterized by having a RAM 40 of limited storage capacity which in the device operational state already includes the device operating system 45, the device basic administrative and utility application programs 46 and substantially all of the device application programs 47 through 49, which are all already launched in RAM in the normal device operational state. All of the OS and application programs are also permanently flashed into and stored in the device flash ROM 43.

Figure 2:
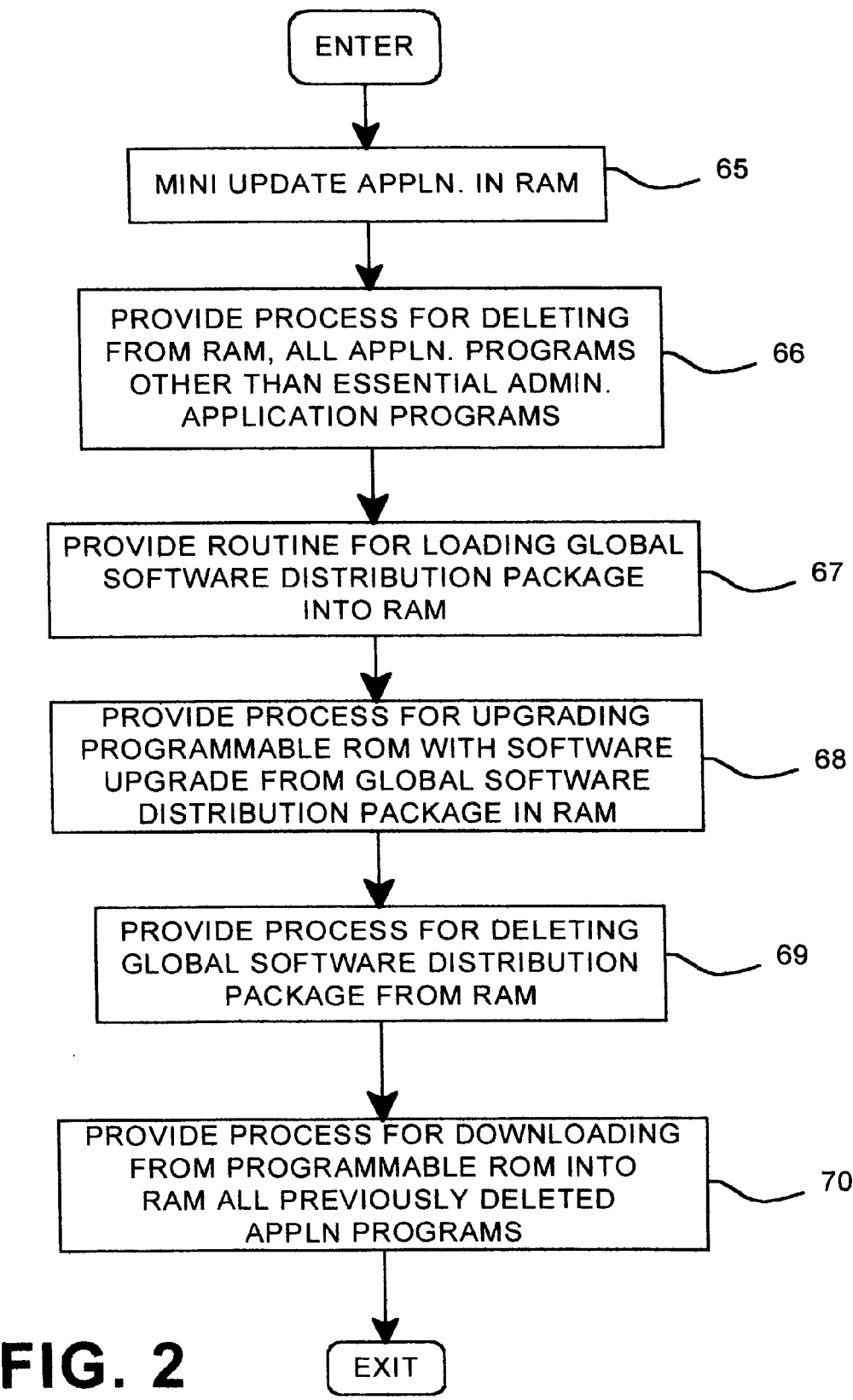
FIG. 2 is an illustrative flowchart describing the setting up of the method of the present invention for the handling of the global software distribution package at a receiving personal palm-type device.

Now with reference to the programming set up shown in FIG. 2, the program of the present invention is set up, step 65, to reside in RAM, Miniupdate 44, FIG. 1. When the global software distribution package is received at the personal palm device from the Web, a process must be set up, step 66, for deleting from RAM all application programs 47 through 49 (FIG. 1), other than the administrative application programs 46.

A routine is then provided for then loading the global software distribution package in RAM, step 67, by using the additional RAM capacity made available through the deletion of applications 47 through 49. Now, step 68, the process for the software upgrade or distribution through the received global package is provided. This upgrade or distribution is done by writing into the appropriate system and programs stored in ROM 43 through flashing the ROM. Upon the completion of step 68, a process is set up for completely deleting the global software distribution package from RAM. Then, step 70, the process is set up to download back into RAM, all of the application programs previously deleted from RAM to make capacity available for the global software distribution package. These are downloaded from their permanent storage in ROM, and the device RAM is restored to its previous but upgraded state.

Figure 3:
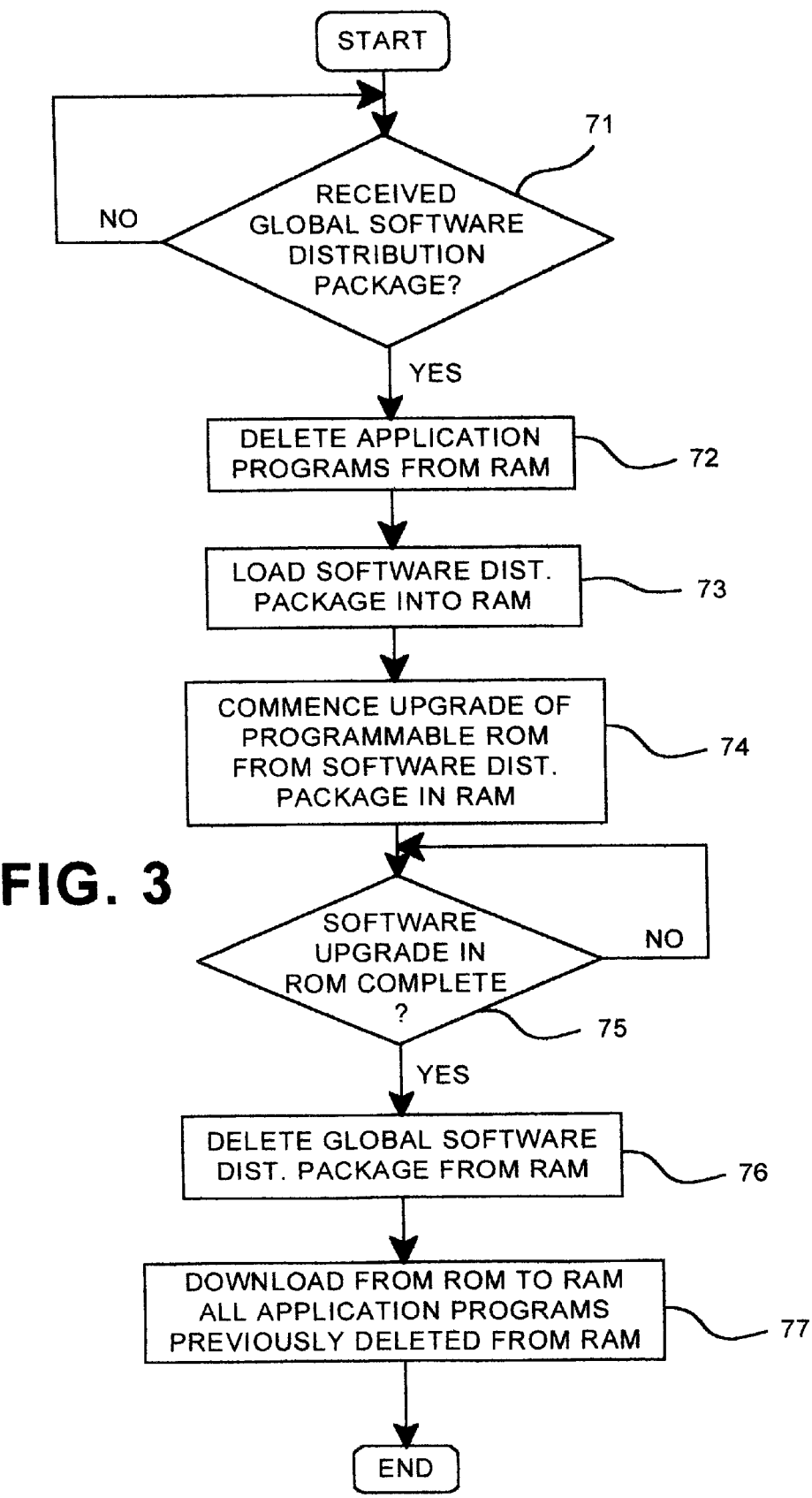
FIG. 3 is a flowchart of an illustrative run of the method set up in FIG. 2.

Now, with reference to the flowchart of FIG. 3, a simplified illustrative run of the process set up in FIG. 2 will be described. Initially, a determination is made as to whether the global software distribution package has been received, step 71. If No, then the process is returned to step 71 and the package is awaited. When the package is received and the determination from step 71 is Yes, then, step 72, the unnecessary application programs are deleted from RAM, and the global software distribution package is loaded into RAM, step 73. At this stage, step 74, the software distributed upgrade is commenced by writing into flash ROM from the software distribution package in RAM. This is conducted under the control of a distribution management agent within the software distribution package. In the case of the Tivoli Software Distribution Package, this is known as the Tivoli Management Agent. Next, decision step 75, a determination is made as to whether the upgrade is complete. If No, the process branches back to step 75 where the completion of step 74 is awaited. When completed and the decision from step 75 is Yes, then step 76, the global software distribution package is deleted from RAM, step 76, and the previously deleted application programs are downloaded from ROM to RAM, step 77. The process is then exited leaving the personal palm-type device in its original but upgraded state.

Although certain preferred embodiments have been shown and described, it will be understood that many changes and modifications may be made therein without departing from the scope and intent of the appended claims.

What is claimed is:

1. A method for distributing software to a personal palm-type device having limited RAM capacity and a persistent programmable ROM using a global software distribution package requiring RAM capacity in excess of available RAM in said device comprising the steps of:

deleting from RAM, all application programs other than application programs required to support the device operating system in receiving said software distribution package;

loading said global software distribution package into said RAM;

loading software from said global distribution package into the device programmable ROM;

deleting said global distribution package from said RAM; and downloading from said programmable ROM into said device RAM, all deleted application programs.

2. The method of claim 1 wherein the global software distribution package is transmitted to said personal palm-type device over a communication network.

3. The method of claim 1 wherein the global software distribution package is transmitted to said personal palm-type device over the World Wide Web.

4. The method of claim 3 wherein said global software distribution package is an enterprise system software distribution package.

5. The method of claim 4 wherein said personal palm-type device is synchronized with a computer controlled receiving station on said World Wide Web, and the software distribution package is received by said palm-type device through said receiving station.

6. The computer program of claim 5 further including:

means for synchronizing said personal palm-type device with a computer controlled receiving station on said World Wide Web; and means for transmitting the software distribution package to said palm-type device through said receiving station.

7. A computer program having code recorded on a computer readable medium operable on a personal palm-type device having limited RAM capacity and a persistent programmable ROM for receiving software for said device from a global software distribution package requiring RAM capacity in excess of available RAM in said device comprising:

means for deleting from RAM, all application programs other than application programs required to support the device operating system in receiving said software distribution package;

means for loading said global software distribution package into said RAM;

means for loading software from said global distribution package into the device programmable ROM;

means for deleting said global distribution package from said RAM; and means for downloading from said programmable ROM into said device RAM, all deleted application programs.

8. The computer program of claim 7 further including means for transmitting said global software distribution package to said personal palm-type device over a communication network.

9. The computer program of claim 7 further including means for transmitting the global software distribution package to said personal palm-type device over the World Wide Web.

10. The computer program of claim 9 wherein said global software distribution package is an enterprise system software distribution package.

* * * * *